Sept. 4, 1923.

V. C. STANLEY

STORAGE BATTERY

Filed April 15, 1922

1,466,674

INVENTOR

Vincent C. Stanley
BY
C. E. Beach
ATTORNEY

Patented Sept. 4, 1923.

1,466,674

UNITED STATES PATENT OFFICE.

VINCENT C. STANLEY, OF BROOKLINE, MASSACHUSETTS, ASSIGNOR TO THE GAME-WELL FIRE ALARM TELEGRAPH COMPANY, OF NEW YORK, N. Y., A CORPORATION OF NEW YORK.

STORAGE BATTERY.

Application filed April 15, 1922. Serial No. 552,862.

*To all whom it may concern:*

Be it known that I, VINCENT C. STANLEY, a citizen of the United States, residing at Brookline, county of Norfolk, and Commonwealth of Massachusetts, have invented certain new and useful Improvements in Storage Batteries, of which the following is a specification.

This invention relates to storage batteries, and is particularly adapted for use in small storage batteries of the so-called "two-plate" type generally employed for supplying individual signaling circuits of fire and police alarm systems.

As is well understood by those skilled in this art, storage batteries of the type referred to are usually employed in duplicate sets, so that such batteries may be alternately recharged and so that the application of charging current to a discharging battery may at all times be avoided. The importance of avoiding the application of charging current to such a discharging battery is emphasized by the fact that the electromotive force ordinarily supplied by such signaling batteries is comparatively low, being frequently in the order of 10, 20, 30 volts; and the insulation and resistance of the current paths of the circuits connected to such batteries are usually such as would be likely to suffer injury were an electro-motive force many times that intended applied thereto, while the electromotive forces of the commercial circuits employed for charging such storage battery are usually on the order of 110, 220 and 500 volts.

It is also well known that the operating conditions of signaling circuits such as those ordinarily supplied by storage batteries of the type referred to are usually such as would be objectionably disturbed, if not completely deranged, by leakage thereto of current from a comparatively high voltage commercial lighting or power circuit; this being particularly true because of the extremely small current flow (usually on the order of 10, 20 . . . 100, 110 milliamperes) commonly utilized for such signaling circuits.

For these reasons it has been found to be extremely important that the exteriors of the glass cells or electrode containers of such signaling batteries, and the supports provided therefor, shall be kept scrupulously dry and clean, so as to minimize leakage between charging batteries and discharging circuits. To this end, insulating covers have been employed, such as that disclosed by the patent to Berst, dated August 13, 1907, No. 863,347, with a view of minimizing the escape of vapor or spray from the electrolyte of the cells of such a battery during charge or discharge thereof. In constructing such prior covers it has been needful to provide openings therein for the connecting and supporting lugs of the electrodes as such lugs have rested upon the upper edges of the containing cells and have therefore extended above the upper surfaces of such cells. Because of such openings, vapor and spray has been permitted to escape from such cells and to accumulate upon portions of such lugs which are exposed to air currents and to accumulations of dust.

It is well known that surfaces having accumulations of electrolyte thereon will, if exposed to air currents, acquire incrustations of salts which, as they work down into the cell, tend to draw electrolyte therefrom and thereby increase the volume and rate of extension of such incrustation. Unless such incrustations are removed at comparatively frequent intervals, they will spread from such lugs over the outer surfaces of the cells, and will finally act as a capillary medium for siphoning electrolyte from the interior of such cells; thus providing a conducting film over the exterior portions of battery cells, and over their supports, through which objectionable electrical leakage will occur. It has been found that accumulations of dust upon and adjacent to such incrustations tend to accelerate the formation and extension thereof, and also tend to cause such incrustations to be harder and to adhere more firmly to the surfaces upon which they are formed, thus rendering their removal more difficult.

It is well recognized by those who have had the care of batteries, such as those hereinbefore referred to, that it is very difficult to keep the connecting lugs free from such salts between the adjacent cells of prior batteries, and to prevent the accumulation of such incrustations upon the outer walls of such cells, because of the small size of the cells and the parts thereof and because of the necessity for minimizing the area occupied by such batteries.

An important object of this invention is to provide a storage battery of the character described in which the parts are so constructed and arranged that the connections between electrodes of adjacent cells will be so enclosed that surfaces thereof which are exposed to vapor and spray from the electrolyte will not be exposed to air currents outside of the cells, nor will such surfaces be exposed to accumulation of atmospheric dust thereon.

Another object is to provide features of construction and arrangement of such a storage battery whereby the outer surfaces of the containers of the individual cells thereof can be more readily kept clean and dry than has been the case with any such prior cell.

Another object is to provide such relative construction of the electrode supporting lugs and the container walls engaged thereby as to maintain suitable spacing between adjacent faces of one and the other of electrodes supported within respective containers and between faces of such electrodes and adjacent container walls, and such that the electrolyte of such cells will not be withdrawn by capillary siphoning action occurring along the surfaces of such lugs, even if such surfaces become incrusted with salts and dust.

Another object is to provide such a storage battery having a terminal arrangement such as to minimize danger of breaking walls of the cells through strain applied thereto by terminal leads.

Other objects will be in part obvious and in part specifically set forth in the following specification.

For the purpose of illustrating this invention, certain embodiments thereof are depicted in the drawings annexed to and forming part of this disclosure, and in such drawings like character of reference denote corresponding parts throughout all of the views, in which.

Figure 1:
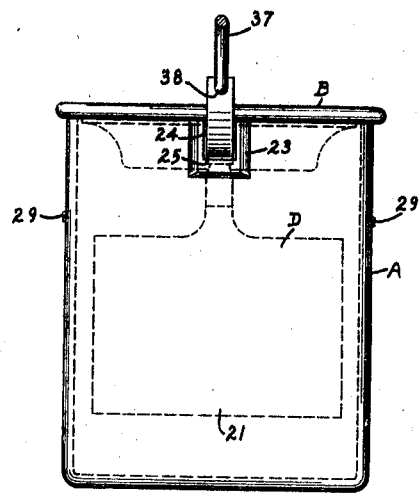
Figure 1 is an end elevation of a battery embodying this invention.
Figure 2:
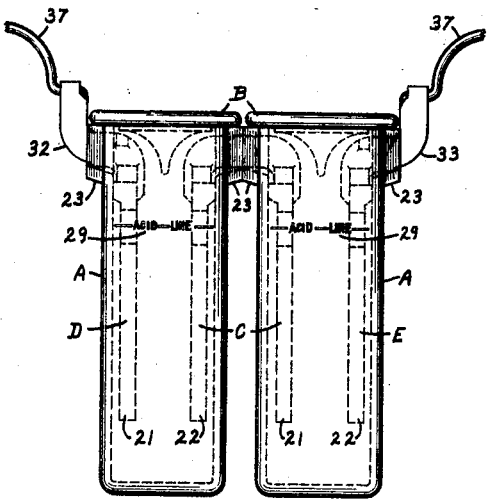
Fig. 2 is a side elevation of the battery of Fig. 1.
Figure 3:
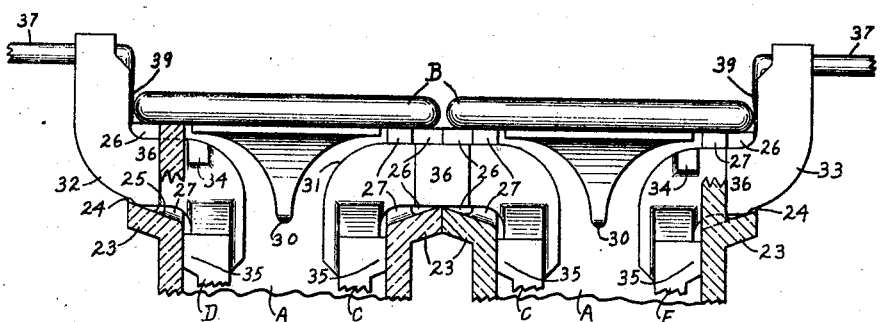
Fig. 3 is an enlarged fragmentary side elevation of the upper portion of the battery cells of Figs. 1 and 2, with certain portions thereof broken away and shown in section.

Referring particularly to Figs. 1, 2 and 3,—the cell containers or jars generally indicated by the reference letter A are each of such size as to suitably contain a positive and a negative electrode, such as the electrodes 21 and 22, and are surmounted by the covers B, B. Adjacent electrodes of the contiguous cells are suitably joined in a so-called "couple" generally indicated by the reference letter C, and the terminal elements generally indicated by the reference letters D and E are each provided with a supporting lug and a permanently connected flexible lead having novel features to be hereinafter more fully described.

Figure 4:
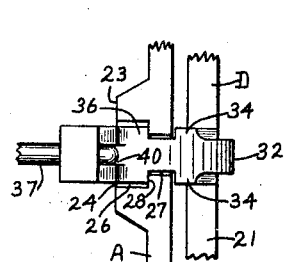
Fig. 4 is an enlarged fragmentary plan view of the terminal supporting lug and adjacent container wall of the cells of Figs. 1 and 2.

Each of the jars A has outwardly extending bosses 23, 23 formed on oppositely disposed portions adjacent the upper edges of the walls thereof. Spout-like grooves 24, 24 are formed in the bosses 23, 23 and in the portions of the jar walls adjacent to said bosses. The lower walls 25 of the grooves 24, 24 slant downwardly toward the interior of the jars, so that any liquid which collects in said grooves will be conducted into said jars. The portion 26 of each groove which is formed within the boss is of greater width than the portion 27 which is formed within the wall of the jar (as best shown by Fig. 4), and an abutment 28 is provided between said portions 26 and 27 for a purpose which will be hereinafter more fully explained. Legends 29 are cast in the walls of the jars A to indicate the level at which the electrolyte should be maintained.

The covers B, B rest upon the upper edges of the walls of the jars A, A and extend outside the general outlines of said jars. These covers extend over the grooves 24, 24 to a point well outside of the outer surfaces of the perpendicular walls of the jars, and may extend to the outer faces of the bosses 23, 23; although it may be deemed preferable to restrict the width of the covers somewhat, so as to allow for variations in the sizes of the covers and the widths of the jars between the outer faces of the lugs. The under surfaces of the covers extend downwardly between the electrodes, and are so formed as to provide ridges 30, so that electrolyte or vapor which spatters or condenses upon lower faces of the covers will drain down to said ridges and drop back into the main body of the electrolyte within the cells.

Each of the electrodes has a terminal and supporting lug formed integral therewith; the adjacent electrodes of the couple C being united and supported by the lug 31, and the projections 36 are omitted, but the terminal elements are each provided with a projection 41 which extends downwardly from the lug 32 or 33 (as the case may be) for engagement with the outer end of the lower wall of the boss 23'. Although this arrangement provides some opportunity for siphoning accumulations of electrolyte from the grooves of terminal cells, it will not cause siphoning from the main body of the electrolyte within the cells, and possesses the other advantages of the embodiment of this invention which is shown in Figs. 1 to 4 inclusive; besides being more simple in construction.

The foregoing description is believed to set forth the application and use of this invention so that same will be understood by those skilled in this art without further description herein, but it is to be understood that other structures may be devised which will embody this invention, and the drawings and foregoing description thereof should therefore be considered merely in an illustrative and not in a limiting sense, except in so far as specified in the following claims:

1. As an article of manufacture,—a storage battery electrode having a terminal and supporting lug formed and arranged for entry within a spout-like groove of a container for said electrode, the portion of said lug intended for enclosure by the walls of such container-groove being of a height less than the depth of said groove, the lower face of said lug portion so formed that, if placed in a container-groove the lower wall of which slants downwardly toward the interior of such container, said lug would rest upon such wall only near the outer end thereof, and portions of said lug adjacent to that intended for such enclosure so formed as to be suited for so engaging such a container as to maintain said electrode suitably spaced from the wall of such container and from another similarly supported electrode therein.

2. As an article of manufacture,—a storage battery electrode having a terminal and supporting lug formed and arranged for entry within a spout-like groove of a container for said electrode, the portion of said lug intended for enclosure by the walls of such container-groove being of a height less than the depth of said groove, and portions of said lug adjacent to that intended for such enclosure so formed as to be suited for so engaging such a container as to maintain said electrode suitably spaced from the wall of such container and from another similarly supported electrode therein.

3. As an article of manufacture,—a storage battery electrode having a terminal and supporting lug formed and arranged for entry within a spout-like groove of a container for said electrode, portions of said lug adjacent to that intended for enclosure by the walls of such container-groove so formed as to be suited for so engaging such a container as to maintain said electrode suitably spaced from the wall of such container and from another similarly supported electrode therein.

4. As an article of manufacture,—a storage battery electrode couple having a connecting and supporting lug formed and arranged for entering aligned grooves provided in the upper edges of adjacently disposed cell containers for the respective plates of said couple, the lower walls of which grooves slant downwardly toward the interior portions of respective containers, said lug formed and arranged for so engaging such containers as to maintain the plates of such couple suitably spaced from the walls of such respective containers and from the plates of other similar electrodes correspondingly supported therein, and the portion of said lug intended to enter such container grooves so formed as to facilitate draining of liquid adhering thereto into said containers.

5. As an article of manufacture,—a storage battery electrode couple having a connecting and supporting lug formed and arranged for entering aligned grooves provided in the upper edges of adjacently disposed cell containers for the respective plates of said couple, said lug formed and arranged for so engaging such containers as to maintain the plates of such couple suitably spaced from the walls of such respective containers and from the plates of other similar electrodes correspondingly supported therein.

6. As an article of manufacture,—a storage battery electrode having a terminal and supporting lug formed and arranged for entry within a spout-like groove of a container for said electrode and so that, when contained in such a groove, all portions of said lug exterior such container will be disposed above the lower wall of such groove.

7. As an article of manufacture,—a storage battery electrode having a terminal and supporting lug formed and arranged for entry within a spout-like groove of a container for said electrode and so that, when contained in such a groove, all portions of said lug exterior such container will be disposed above the intended electrolyte level.

8. As an article of manufacture,—a storage battery electrode having a terminal and supporting lug formed and arranged for entry within a spout-like groove of a container for said electrode and so that liquid adhering to said lug will tend to drain into such container.

9. In a storage battery: a plurality of containers each having outwardly extendthe electrodes of the terminal elements D and E being supported by the lugs 32 and 33 respectively.

Although the battery shown comprises but two cells, it will be understood that parts such as those shown may be employed in assembling batteries comprising any desired number of cells; terminal elements such as the elements D and E being provided for the end cells, and the remaining electrodes being grouped in couples such as the couple C.

The lugs 31, 32 and 33 are so formed that, when the electrodes associated therewith occupy intended positions in jars, such as the jars A, A,—portions of said lugs will be enclosed in the grooves 24 of such jars. The height of such enclosed portions of said lugs is such that, when they rest in such grooves in the intended manner, the upper surfaces of such lugs will be disposed below the upper edges of said jars, so as to be suitably spaced away from the lower surfaces of the covers B applied to such jars; and the contour of the lower surfaces of the portions of such lugs which is intended for enclosure in said grooves is so formed that the point of engagement therebetween for the support of said lugs will be at or near the outer ends of such grooves, and so that the distance between the lower walls of the inner ends of said grooves and the under surfaces of said lugs will be great enough to suitably minimize capillary retention of fluid therebetween.

The projections 34, 35 and 36 are formed on the sides of the lugs 31, 32 and 33; and are so positioned that, when said lugs occupy their intended positions in the grooves 24, the projections 34 and 35 will be situated just inside and the projections 36 will be situated just outside of the walls of the jars; to the end that the engagement of such projections with walls of the jars will maintain the electrodes in suitably spaced relation from one another and from such walls.

The general contour of the lugs 31, 32 and 33 is such that the outlines thereof slant toward the interior of the jars, so as to facilitate draining of liquid adhering thereto into the jars; and said lugs are so arranged that no part thereof exterior of the wall of the jar will be situated as low as the bottom of the groove 24, which is, in turn, above the intended electrolyte level; to the end that capillary siphoning will not be induced even should such lugs become more or less coated with salts.

The terminal elements D and E are provided with flexible conductors 37, 37, which conductors are preferably of a material sufficiently pliable to avoid the application of objectionable strain to the walls of the jars during manipulation of such conductors. Lead has been found to be particularly suitable for this purpose, both on account of its pliability and its comparative immunity from deterioration resultant from exposure to acid fumes.

Each of the conductors 37 is secured to the lug with which it is associated by passing such conductor through an opening 38 near the upper end of such lug and bending the end 39 of the conductor downwardly, parallel to the vertical face of such lug. Notches 40 are formed in vertical walls of the upper portions of the lugs 32 and 33, for receiving the ends 39 of said conductors, and said ends are suitably welded or "puddled" in said notches.

From the foregoing it will be seen that when the parts are assembled in the intended manner, as shown, the surfaces of the lugs 31, 32 and 33, which are exposed to electrolyte vapor and spray incident to the action of the cells, are so enclosed as to be protected from air currents and from accumulation of atmospheric dust. The adjacent sides of jars are spaced apart by the bosses 23, which are situated near the tops of the jars, so that the outer surfaces of the jars can more readily be kept clean and dry than has been the case with prior cells. The lugs 31, 32 and 33 are so formed as to eliminate all capillary siphoning of the electrolyte from the interior of the cells, such as would cause electrolyte to drip outside of the cells, and the projections 34, 35 and 36 serve to maintain the electrodes in their intended relationships. Should one of the conductors 37 apply a stress to the element D or E with which it is associated, such as would tend to swing its electrode toward the other electrode in the cell therewith, such movement would be resisted by the engagement of the projection 34 with the inner surface of the wall of the jar A and the engagement of the lower end of the projection 36 with the abutment 28; should such conductor apply stress in the opposite direction, movement in response thereto would be correspondingly resisted by the engagement of the projection 35 with the inner surface of the wall of the jar and the engagement of the upper end of the projection 36 with the abutment 28. In the case of the couple C, the projections 35 and 36 will correspondingly serve to maintain the electrodes in their intended positions.

Figure 5:
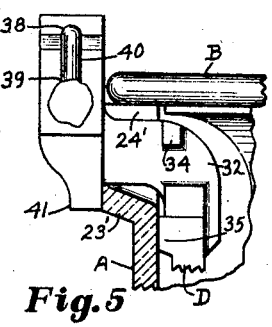
Fig. 5 is a fragmentary side elevation of an alternative construction of the terminal lug structure of Figs. 3 and 4.
Figure 6:
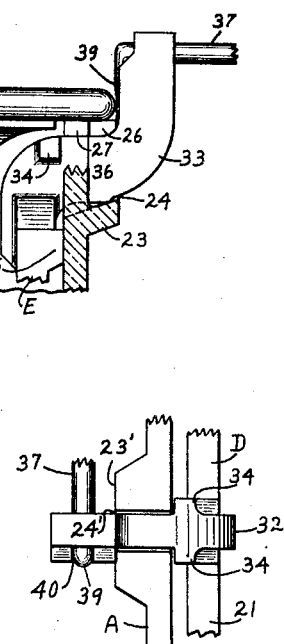
Fig. 6 is a fragmentary plan view of the lug structure of Fig. 5.

Instead of providing a groove 24 having an abutment 28, and utilizing lugs so formed as to be suited for use in such grooves in the manner already described, the arrangement shown by Figs. 5 and 6 may be employed with corresponding results other than as to opportunity for capillary siphoning of electrolyte.

In the arrangement shown by Figs. 5 and 6, the groove 24' is of the same width both in the boss 23' and in the wall of the jar A, ing bosses formed on oppositely disposed portions adjacent the upper edges of walls thereof, said bosses and adjacent portions of the container walls having grooves formed therein the lower walls of which grooves slant downwardly toward the interior of the containers; and electrode couples each comprising plates of opposite polarity connected by a supporting lug formed and arranged for engaging the walls of such containers and said grooves so as to maintain each electrode plate suitably spaced from the walls of the container in which it is disposed and from another plate of a corresponding couple similarly supported by and contained in the same cell.

10. In a storage battery cell: a container having outwardly extending bosses formed on oppositely disposed portions adjacent the upper edges of walls thereof, said bosses and adjacent portions of the container walls having grooves formed therein the lower walls of which grooves slant downwardly toward the interior of said container; and electrodes having supporting lugs disposed within said grooves and formed and arranged for engaging the walls of said container and of said grooves so as to maintain said electrodes suitably spaced from one another and from the walls of said container.

11. In a storage battery cell: a container having outwardly extending bosses formed on oppositely disposed portions adjacent the upper edges of walls thereof, said bosses and adjacent portions of the container walls having grooves formed therein the lower walls of which grooves slant downwardly toward the interior of said container; and electrodes having supporting lugs disposed within said grooves and so formed as to maintain said electrodes suitably spaced from one another and from the walls of said container.

12. In a storage battery cell: a container having spout-like grooves formed in the upper edges of walls thereof, the lower walls of which grooves slant downwardly toward the interior of said container; and electrodes having supporting lugs disposed within said grooves and so formed as to maintain said electrodes suitably spaced from one another and from the walls of said container.

13. In a storage battery cell,—a container having spout-like grooves formed in the upper edge of the wall thereof, and electrodes having supporting lugs disposed within said grooves and so formed as to maintain said electrodes suitably spaced from one another and from the walls of said container.

14. In a storage battery cell,—a container having spout-like grooves formed in the upper edges of walls thereof the lower walls of which grooves slant downwardly toward the interior of said container, and electrodes having supporting lugs disposed within said grooves.

15. In a storage battery cell,—a container having spout-like grooves formed in the upper edges of walls thereof, and electrodes having supporting lugs disposed within said grooves.

16. In a storage battery:—a plurality of containers each having outwardly extending bosses formed on oppositely disposed portions adjacent the upper edges of walls thereof, said bosses having grooves formed therein, the lower wall of each of which grooves slants downwardly toward and communicates with the interior of the container of which it forms a part; electrodes in such containers; lugs carried by said electrodes and disposed within such grooves, said lugs so formed as to facilitate draining of liquid adhering to the surfaces thereof into said containers and so that the upper surfaces of said lugs will be disposed below the upper edges of the container wall, lugs of electrodes of opposite polarity in adjacent cells formed integral to provide electrical connection therebetween and lugs of terminal electrodes so formed that all portions thereof exterior the cells will be disposed above the intended electrolyte level therein, all of said lugs formed and arranged to so engage bosses and container walls as to maintain said electrodes suitably spaced from one another and from the walls of said containers; and covers extending over said grooves and resting upon the upper edges of said containers, respectively, the under surfaces of said covers extending downwardly between the electrodes and being so formed as to facilitate draining of liquid adhering thereto from such extensions.

17. In a storage battery:—a plurality of containers each having outwardly extending bosses formed on oppositely disposed portions adjacent the upper edges of walls thereof, said bosses having grooves formed therein, the lower wall of each of which grooves slants downwardly toward and communicates with the interior of the container of which it forms a part; electrodes in such containers; lugs carried by said electrodes and disposed within such grooves, said lugs so formed as to facilitate draining of liquid adhering to the surfaces thereof into said containers and so that the upper surfaces of said lugs will be disposed below the upper edges of the container walls, lugs of electrodes of opposite polarity in adjacent cells formed integral to provide electrical connection therebetween and lugs of terminal electrodes so formed that all portions thereof exterior the cells will be disposed above the intended electrolyte level therein; projections carried by said lugs, said projections positioned and arranged to so engage bosses and container walls as to maintain said electrodes in suitably spaced relation from one another and from the walls of said containers; and covers extending over said grooves and resting upon the upper edges of said containers, respectively, the under surfaces of said covers extending downwardly between the electrodes and being so formed as to facilitate draining of liquid adhering thereto from such extensions.

In witness whereof, I hereunto subscribe my name, this twelfth day of April 1922.

VINCENT C. STANLEY.

Witnesses:
NATHAN H. SUREN,
F. B. PHILBRICK.